(12) United States Patent
Chen et al.

(10) Patent No.: US 10,615,874 B2
(45) Date of Patent: Apr. 7, 2020

(54) OPTICAL COMMUNICATION WITH LOW TEMPORAL COHERENCE LIGHT

(71) Applicant: Alcatel-Lucent USA Inc., Murray Hill, NJ (US)

(72) Inventors: Haoshuo Chen, Aberdeen, NJ (US); Nicolas Fontaine, Aberdeen, NJ (US); Roland Ryf, Aberdeen, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/728,650

(22) Filed: Oct. 10, 2017

(65) Prior Publication Data

US 2019/0089458 A1    Mar. 21, 2019

Related U.S. Application Data

(60) Provisional application No. 62/559,543, filed on Sep. 16, 2017.

(51) Int. Cl.
*H04B 10/25* (2013.01)
*H04B 10/50* (2013.01)
(Continued)

(52) U.S. Cl.
CPC ....... *H04B 10/2504* (2013.01); *H04B 10/501* (2013.01); *H04B 10/516* (2013.01);
(Continued)

(58) Field of Classification Search
None
See application file for complete search history.

(56) References Cited

U.S. PATENT DOCUMENTS 7,110,675 B2    9/2006  Carey
9,759,860 B2    9/2017  Essiambre et al.
(Continued)

FOREIGN PATENT DOCUMENTS

EP      3125446 A1       2/2017
WO      02/095991 A2     11/2002
WO      2016/185382 A1   11/2016

OTHER PUBLICATIONS

D. Melati, et al., "Optical radiative crosstalk in integrated photonic waveguides", Optics Letters, vol. 39, No. 13, Jul. 1, 2014, pp. 3982-3985.

(Continued)

*Primary Examiner* — Darren E Wolf
(74) *Attorney, Agent, or Firm* — Nokia Technologies Oy (57) ABSTRACT

An apparatus includes an optical data transmitter comprising an optical source of temporally incoherent light, an optical power splitter, an optical mode multiplexer, and a plurality of optical paths. The optical power splitter has an optical input and a plurality of optical outputs. The optical input is connected to receive the temporally incoherent light from the source. The optical mode multiplexer has a plurality of optical inputs and an optical output for connecting to a near end of an all-optical transmission fiber line. Each optical path connects a corresponding one of the optical outputs of the optical power splitter to a corresponding one of the optical inputs of the optical mode multiplexer. One or more of the optical paths of the plurality has or have an optical data modulator. A remaining one of the optical paths of the plurality is configured to transmit reference light from the optical power splitter to optical mode multiplexer.

21 Claims, 4 Drawing Sheets

(51) Int. Cl.
*H04J 14/04* (2006.01)
*H04B 10/516* (2013.01)
*H04B 10/66* (2013.01)
*H04B 10/60* (2013.01)
*H04B 10/40* (2013.01)

(52) U.S. Cl.
CPC .............. *H04B 10/66* (2013.01); *H04J 14/04* (2013.01); *H04B 10/40* (2013.01); *H04B 10/50* (2013.01); *H04B 10/60* (2013.01)

(56) References Cited

U.S. PATENT DOCUMENTS

| | | | | |
|---|---|---|---|---|
| 2003/0053180 | A1* | 3/2003 | Carey | H04B 10/505 398/183 |
| 2004/0208644 | A1* | 10/2004 | Sirat | H04B 10/2575 398/186 |
| 2005/0047453 | A1* | 3/2005 | Futami | G02F 1/00 372/25 |
| 2005/0249509 | A1* | 11/2005 | Nagarajan | B82Y 20/00 398/198 |
| 2011/0243490 | A1* | 10/2011 | Ryf | G02B 6/29311 385/1 |
| 2012/0057863 | A1* | 3/2012 | Winzer | H04B 10/60 398/3 |
| 2012/0177384 | A1* | 7/2012 | Ryf | H04B 10/2581 398/202 |
| 2013/0089333 | A1* | 4/2013 | Shen | H04B 10/506 398/79 |
| 2017/0033870 | A1* | 2/2017 | Dangui | H04J 14/0279 |

OTHER PUBLICATIONS

K. Saitoh and S. Matsuo, "Multicore Fiber Technology", Journal of Lightwave Technology, vol. 34, No. 1, Jan. 1, 2016, pp. 55-66.
Roy G.H. van Uden, et al., "Time domain multiplexed spatial division multiplexing receiver", Optics Express, vol. 22, No. 10, May 2014, pp. 12668-12677.
M.E. Marhic, "Coherent Optical CFMA Networks", Journal of Lightwave Technology, vol. 11, No. 5/6, May/Jun. 1993, pp. 854-864.
T. Hamanaka, et al., "Ten-User Truly Asynchronous Gigabit OCDMA Transmission Experiment With a 511-Chip SSFBG En/Decoder", Journal of Lightwave Technology, vol. 24, No. 1, Jan. 2006, pp. 95-102.
B. Puttnam, et al., "Investigating self-homodyne coherent detection in a 19 channel space-division-multiplexed transmission link", Optics Express, vol. 21, No. 2, Jan. 2013, pp. 1561-1566.
B. Huang, et al., "All-fiber mode-group-selective photonic lantern using graded-index multimode fibers", Optics Express, vol. 23, No. 1, Jan. 2015, pp. 224-234.
Chen et al., "Optical Crosstalk Reduction using Amplified Spontaneous Emission (ASE)", Optical Fiber Communications Conference and Exposition (OFC), Mar. 11-15, 2018, 3 pages.
International Search Report and Written Opinion received for corresponding Patent Cooperation Treaty Application No. PCT/US2018/050326, dated Jan. 28, 2019, 13 pages.

* cited by examiner

OPTICAL COMMUNICATION WITH LOW TEMPORAL COHERENCE LIGHT

This application claims the benefit of U.S. provisional application 62/559,543, filed Sep. 16, 2017, by Haoshuo Chen, Nicolas Fontaine, and Roland Ryf.

BACKGROUND

Technical Field

The invention relates to components, systems, and methods for use in optical fiber communication.

Related Art

This section introduces aspects that may be help to facilitate a better understanding of the inventions. Accordingly, the statements of this section are to be read in this light and are not to be understood as admissions about what is prior art or what is not prior art.

Various techniques have been proposed to increase the data capacity of an optical fiber to and/or to lower the cost or the energy consumption per bit during optical fiber communication. The techniques include modulation techniques, such as, wavelength division multiplexing (WDM), phase-shift keying (PSK), polarization multiplexing (PM), and space-division multiplexing (SDM) and fabrication techniques such as optical integration. WDM uses a plurality of wavelength channels to carry different data-modulated optical carriers, e.g., independently data-modulated optical carriers. PSK uses phase modulation of optical carrier(s) to carry digital data. PM uses orthogonal polarization propagation modes of an optical fiber to carry different or independently data modulated optical carriers. SDM uses orthogonal lateral spatial propagating modes of a multimode optical fiber (MMF) or of a multicore optical fiber (MCF) to carry differently or independently data modulated optical carriers. Optical integration typically involves integrating multiple components for optical processing optical beams into or onto one or more physically integrated, planar optical structures. The components may include optical modulators, optical multiplexers/demultiplexers, optical amplifiers, lasers, optical mixers or interferometers, optical polarization splitters and rotators, optical filters, and/or optical intensity detectors.

Various techniques for increasing capacities of optical fibers and/or lowering cost or energy consumption also can cause degradations of the optical signals used to carry and transmit data optically. For example, these techniques can cause optical crosstalk (OXT) between optical carriers having different data modulations. For this reason, an optical communication system may include device(s) for compensating and/or reducing undesired effects of such degradations on the data-carrying optical carriers.

SUMMARY OF SOME ILLUSTRATIVE EMBODIMENTS

Various embodiments provide are useable in optical fiber communication via data-modulated optical carriers having low temporal coherence. Due to the low temporal coherence, such embodiments may be able to transmit a plurality of data-modulated optical carriers, in parallel temporally, over different optical channels of an optical transmission fiber. Due to the low temporal coherence, such embodiments may produce less optical crosstalk and/or mixing between the different data-modulated optical carriers than in other optical fiber communication systems, which are based on temporally coherent optical carriers. Due to the low temporal coherence, optical crosstalk within the same optical communication channel may also be decreased in some such embodiments.

In first embodiments, an apparatus includes an optical data transmitter comprising an optical source of temporally incoherent light, an optical power splitter, an optical mode multiplexer, and a plurality of optical paths. The optical power splitter has an optical input and a plurality of optical outputs. The optical input is connected to receive the temporally incoherent light from the source. The optical mode multiplexer has a plurality of optical inputs and an optical output for connecting to a near end of an all-optical transmission fiber line. Each of the optical paths connects a corresponding one of the optical outputs of the optical power splitter to a corresponding one of the optical inputs of the optical mode multiplexer. One or more of the optical paths of the plurality has or have an optical data modulator. A remaining one of the optical paths of the plurality is configured to transmit reference light from the optical power splitter to optical mode multiplexer.

In the first embodiments, the remaining one of the optical paths may not have an optical data modulator.

In any of the first embodiments, the optical data modulators of the one or more of the optical paths may include Mach-Zehnder interferometers.

In any of the first embodiments, the optical mode multiplexer may be configured to transmit light from each of the optical paths primarily to a corresponding and relatively orthogonal optical propagating mode of the all-optical transmission fiber line.

In any of the first embodiments, the optical mode multiplexer may be configured to transmit light from some of the optical paths primarily to a corresponding and relatively orthogonal lateral spatial, optical propagating mode of the all-optical transmission fiber line.

In any of the first embodiments, the remaining one of the optical paths may be configured to not temporally modulate light therein.

In any of the first embodiments, each pair of the optical paths may be configured to transmit light from the optical source to the near end of the all-optical transmission fiber line with a relative delay longer than the temp, oral coherence of the optical source.

In any of the first embodiments, the apparatus may further include the all-optical transmission fiber line and an optical data receiver connected to a far end of the all-optical transmission fiber line. Also, the relative delays may be such that light traversing the optical paths of one of the pairs has a relative delay along the length of the all-optical transmission fiber line of greater than the temporal coherence thereof.

In any of the first embodiments, the optical data transmitter may be configured to transmit the reference light and the light of at least one of the one or more of the optical paths to primarily different and relatively orthogonal polarization propagating modes of the all-optical transmission fiber line.

In any of the first embodiments, the optical source may include an optical amplifier not configured to produce lasing.

In second embodiments, an apparatus includes an optical data receiver including an optical mode demultiplexer. The optical mode multiplexer has an optical input and a plurality of optical outputs. Each optical output is connected to a first end of a corresponding optical path of a parallel array. One or more of the optical paths are in a first group. Each optical path of the first group has an optical mixer there along and is connected to deliver light of the optical path of the first group to a first optical input of the optical mixer. A remaining one of the optical paths of the array is connected to deliver light to a second optical input of each optical mixer. For each optical mixer, a corresponding optical intensity detector is configured to measure light interference at the optical output the each optical mixer.

In any of the second embodiments, the optical data receiver may include one or more optical processors to reduce a relative optical delay between light mixed in at least one of the optical mixers.

In any of the second embodiments, each optical processor may include an adjustable optical delay line.

In any of the second embodiments, each optical processor may include, at least, an adjustable optical dispersion adjuster or an adjustable optical polarization rotator.

In any of the second embodiments, each optical mixer may include an optical hybrid.

In any of the second embodiments, the mode demultiplexer may be configured to demultiplex light from relatively orthogonal optical propagating modes with different lateral intensity or phase profiles.

In any of the second embodiments, the mode demultiplexer may be configured to demultiplex light from relatively orthogonal polarization propagating modes.

In third embodiments, a method includes optical power splitting light from an optical source of temporally incoherent light into a reference light beam and one or more signal light beams. The method includes modulating the one or more signal light beams to carry corresponding digital data streams. The method includes transmitting each light beam primarily into a corresponding and relatively orthogonal optical propagating mode of an all-optical transmission fiber line at a near end thereof.

In any of the third embodiments, the method may also include relatively delaying a pair of the light beams so that mutually coherent portions of the light beams of the pair do not enter the near end of the all-optical fiber transmission line approximately simultaneously.

In fourth embodiments, a method includes optically mode demultiplexing light received from an adjacent end of an optical transmission fiber line, in parallel, into one or more signal light beams and a reference light beam. The method includes optically mixing a portion of the light of the reference light beam with light of each or the one or more signal light beams in a manner to produce optical interference therebetween. The method includes making a temporal series of time-averaged measurements of light intensities produced by the optically mixing of each of the one or more signal light beams, separately.

In any of the third embodiments of the method, the optically mixing may further include optically processing the portion of light of the reference light beam or the light of each signal light beam to be mixed therewith to increase a mutual coherence of the light of said beams during said optically mixing.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Herein, temporally incoherent light refers to light having, at most, a temporal coherence lower than a symbol period. For example such light of low temporal coherence, may be produced in sources that largely emit light by spontaneous emission rather than by stimulated emission as in lasers. A source of temporally incoherent light typically does not have an optically resonant cavity, e.g., a pumped optical amplifier may produce temporally incoherent light in the absence of optical feedback from a resonant optical cavity. Herein, temporally incoherent light may also be referred to as light of low temporal coherence, because temporally incoherent light still exhibits some mutual coherence over short time periods.

Figure 1:
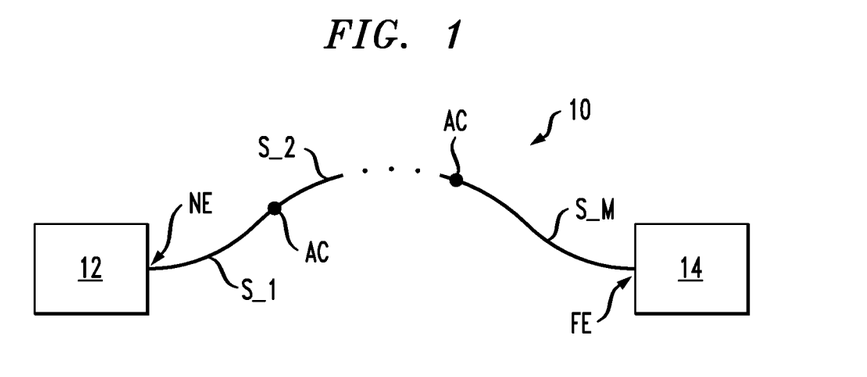
FIG. 1 is a block diagram schematically illustrating an optical fiber communication system configured to use one or more optical carriers of low temporal coherence.

FIG. 1 schematically illustrates an optical fiber communication system 10 that uses one or more optical carriers of low temporal coherence to transmit data. In embodiments with more than one data-modulated optical carrier, different ones of the data-modulated optical carriers may be in the same or about the same wavelength or frequency band.

The optical fiber communication system 10 includes an optical data transmitter 12, and optical data receiver 14, and an all-optical transmission fiber line 16 coupling the optical data transmitter 12 to the optical data receiver 14.

The optical data transmitter 12 transmits one or more data-modulated optical carriers to the near end (NE) of the all-optical transmission fiber line 16. The optical data transmitter 12 also transmits a reference optical carrier, e.g., a non-data modulated optical carrier, to the same near end NE of all-optical transmission fiber line 16.

The various optical carriers have low temporal coherence, but temporal segments of each data-modulated optical carrier are mutually coherent with corresponding temporal segments of the reference optical carrier, i.e., segments shorter than the temporal coherence length of the reference optical carrier. Typically, the individual optical carriers are formed by optically power splitting a single initial optical carrier of low temporal coherence. Then, individual temporal segments of each optical carriers are mutually coherent in a segment-by-segment manner, e.g., for segments shorter than the coherence length of said initial optical carrier.

At the near end NE, the optical data transmitter 12 typically transmits each optical carrier substantially to a single corresponding optical propagating mode of the all-optical transmission fiber line 16, e.g., to a relatively orthogonal propagating mode. For example, more of the power of each optical carrier may be transmitted to the corresponding optical propagation mode than to the collection of relatively orthogonal optical propagation modes of the all-optical transmission fiber line 16.

The all-optical transmission fiber line 16 has M spans S_1, S_2, . . . , S_M of optical transmission fiber where M may be any positive integer. Each span of optical transmission fiber may be single-mode optical fiber (SMF), a multimode optical fiber (MMF), multicore optical fiber(s) (MCF(s)), or a parallel array of SMFs, MMFs, or MCFs. Neighboring pairs of the spans S_1-S_M are end-connected by all-optical couplers AC. If the optical transmission fibers of the spans S_1-S_M are single SMFs, the optical data transmitter 12 typically transmits two optical carriers, in parallel, to optical propagation modes of relatively orthogonal polarization at the near end NE of the all-optical transmission fiber line 16. If the optical transmission fibers are MMFs or MCFs, the optical data transmitter 12 typically transmits each optical carrier to an optical propagation mode of relatively orthogonal polarization and/or lateral spatial profile at the near end NE of the all-optical transmission fiber line 16.

The optical data receiver 14 receives, from the far end FE of the all-optical transmission fiber line 16, light of the optical propagating modes of the all-optical transmission fiber line 16, which are excited, at the near end NE, by the optical data transmitter 12. The optical data receiver 14 is constructed to use matched detection to recover the data stream(s) modulated onto one or more of the data-modulated optical carriers. In particular, the use of light of low temporal coherence to carry data makes direct detection of such carried data difficult, because the phase, amplitude, and possibly polarization of such light varies, in time, due to the low temporal coherence itself. In the optical data receiver 14, the optical matched detection involves mixing the received light for each of the one or more data-modulated optical carriers individually with light of the reference optical carrier and then, measuring the interference of said light, averaged over the symbol period for the transmitted symbol. The mixing and measuring may be performed using conventional ninety-degree optical hybrids and matched diode detectors set up for coherent optical detection of data, e.g., in an in-phase (I), quadrature-phase (Q), I/Q, format for or not for detection of polarization multiplexed data transmission. For each such optical carrier, received light may be obtained from the optical propagating mode(s), to which light of said optical carrier was transmitted at the near end NE of the all-optical transmission fiber line 16 by the optical data transmitter 12. That is, the same set of optical propagating modes, to which the optical data transmitter 12 transmitted optical carriers, may be used to extract received light of the various optical carriers in the optical data receiver 14.

In the optical data receiver 14, such mixing of light received from pairs of optical propagation modes can produce interference useful for recovering the transmitted data stream(s) if the mixing uses light whose relative cumulated transmission delay is about equal to or less than the temporal coherence length of such light. For this reason, the optical data receiver 14 may be configured to relatively temporally align the received light from such pairs of different optical propagating modes when mixed therein, e.g., align to within the temporal coherence length with an adjustable light delay line. The optical data receiver 14 may also be configured to perform relative dispersion compensation and/or a relative polarization rotation(s) to better align the dispersion and/or polarization of the mixed light from such pairs of optical propagating modes. Without such optical preprocessing, optically mixing light received from different optical propagating modes may only produce low light intensity variations, which made lead to erroneous measurements for data recovery, e.g., due to amplitude, phase, and/or polarization variations over the symbol interval for light of low coherence.

Figure 2:
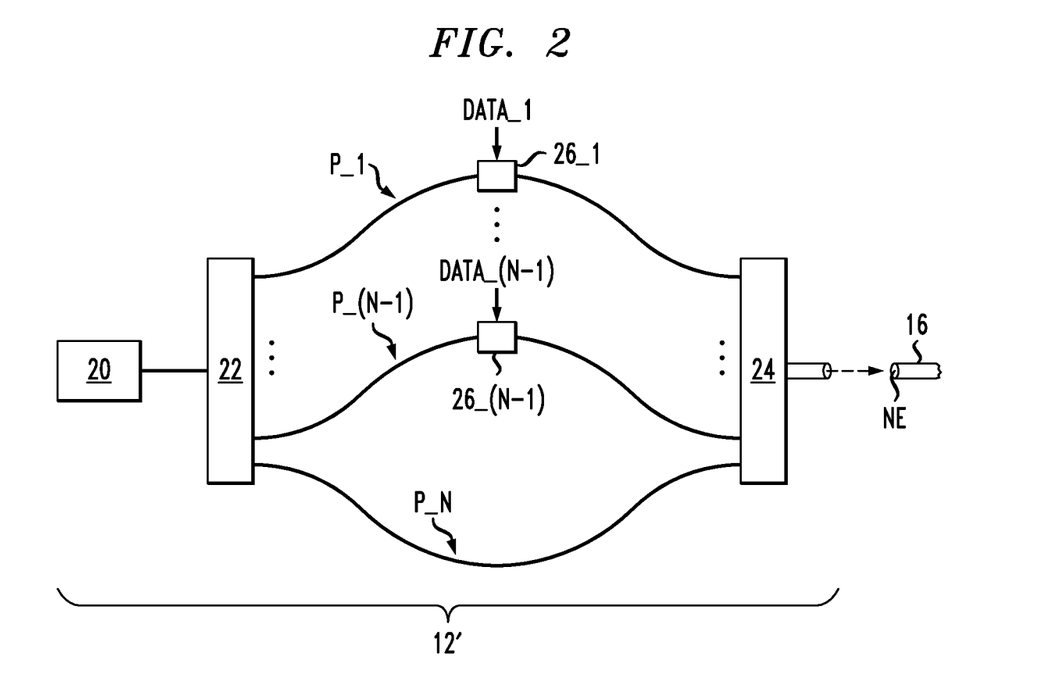
FIG. 2 is a block diagram illustrating a specific embodiment of the optical data transmitter of FIG. 1.

FIG. 2 illustrates a specific embodiment 12' of the optical data transmitter 12 of FIG. 1. The optical data transmitter 12' includes a low temporal coherence optical source 20, a 1×N optical power splitter 22, an N×1 optical mode multiplexer 24, and a parallel array of N optical paths P_1, . . . , P_(N−1), P_N connecting the optical outputs of the 1×N optical power splitter to corresponding optical inputs of the N×1 optical mode multiplexer 24. Here, N is an integer that is greater than or equal to 2, e.g., N may be 2, 3, 4, 5, 6, 7, 8, 9, 10, etc. depending on the number, i.e., (N−1), of optical propagating modes used for parallel transmission of separate digital data streams.

Herein, an optical path, e.g., any of the optical paths P_1-P_N, may be an optical path in an optical fiber, in an optical waveguide, and/or in free space.

The low temporal coherence optical source 20 may be a conventional source of light of low temporal coherence. For example, the source of light of low temporal coherence may be the optical source 20' of FIG. 4, which includes an optical gain medium 27, one or more pumps 28, and an optical filter 29. The optical gain medium 27 may be, e.g., a conventional rare-earth doped optical fiber such as an erbium doped optical fiber (EDF) or may be, e.g., the optical gain medium of a semiconductor optical amplifier (SOA). The one or more pumps 28 is an optical or electrical structure for pumping the optical gain medium 27 to emit light. For example, the one or more pumps 28 may be an array of diode lasers that provide light of appropriate wavelength(s) to pump an EDF of the optical gain medium 27 to emit light in the optical telecommunications C and/or L band(s) or may be a voltage biasing structure for electrically pumping an SOA to emit light in the same C and/or L band(s). The optical filter 29 may be a conventional optical bandpass filter connected to receive light from the optical gain medium 27 and pass a narrow wavelength or frequency range of said light.

Figure 4:
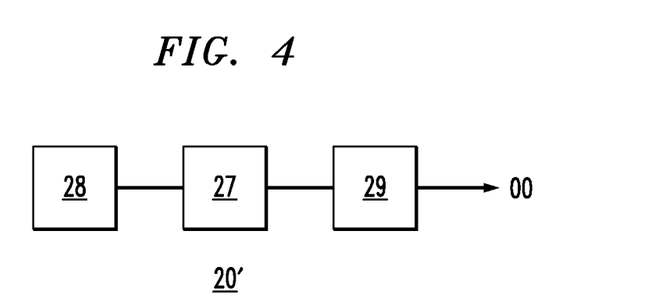
FIG. 4 is a block diagram illustrating an example of an optical source of low temporal coherence, e.g., for use in the optical data transmitters of FIGS. 1 and 2.

The light source 20' produces light by spontaneous emission, e.g., without a resonant optical cavity to provide enough optical feedback capable to produce lasing. For that reason, the phase, amplitude, and polarization of the light emitted at the optical output (OO) typically has low temporal coherence, e.g., is noise-like. The inventors believe that such filtered spontaneous emission light may be more useful for optical communication if the frequency or waveguide width, i.e., the full-width at half maximum, of the bandpass filtered light at the optical output OO is greater than the data symbol rate, i.e., the baud rate, of the optical data transmitter 12' of FIG. 2. For example, said frequency width of the light output at the optical output OO may be, at least, twice the data symbol rate, and may preferably be five or more times the data symbol rate so that a substantial reduction in inter-channel optical crosstalk produced during optical fiber communication.

The 1×N optical power splitter 22 may be, e.g., any conventional optical power splitter that splits, the light received from the optical source 20, into N parallel, mutually coherent light beams directed to the N corresponding optical paths P_1, . . . , P_(N−1), P_N of the parallel array.

In a first group, each of (N−1) of the optical paths P_1-P_(N−1) couples one optical output of the optical power splitter 22 to a corresponding optical input of the optical mode multiplexer 24. Each of (N−1) of the optical paths P_1-P_(N−1) of the parallel array includes a conventional optical data modulator 26_1, . . . , 26_(N−1) thereon. Each optical data modulator 26_1-26_(N−1) modulates a received separate digital data stream DATA_1, . . . , DATA_(N−1) onto the optical carrier in the same optical path P_1, . . . , P_(N−1), e.g., using a conventional optical phase and/or amplitude modulator such as an electrically driven, nested, Mach-Zehnder optical interferometer.

A second group of a single optical path P_N of the parallel array couples one optical output of the 1×N optical power splitter 22 to a corresponding optical input of the N×1 optical mode multiplexer 24.

The N×1 optical mode multiplexer 24 typically end couples the N parallel optical paths P_1, . . . , P_N primarily or almost completely to corresponding and relatively orthogonal optical propagation modes of the all-optical transmission fiber line 16 at a near end (NE) thereof.

In some embodiments, N−1 or N of the parallel optical paths P_1, . . . , P_N optical paths introduce relative delays between the light output at the near end NE of the all-optical transmission fiber line 16 by different ones of the N optical paths P_1, . . . , P_N. For example, the introduced relative delays may be large enough to ensure that mutually coherent time segments of the N different optical paths P_1-P_N do not simultaneously co-propagate over a substantial length of the all-optical transmission fiber line 16. In such a configuration, the low temporal coherence of the optical source 20 typically reduces optical crosstalk between light propagating on the different and relatively orthogonal propagation modes in the all-optical transmission fiber line 16. For that reason, such embodiments may reduce inter-channel optical crosstalk when implemented in the optical fiber communication system 10 of FIG. 1.

Figure 3:
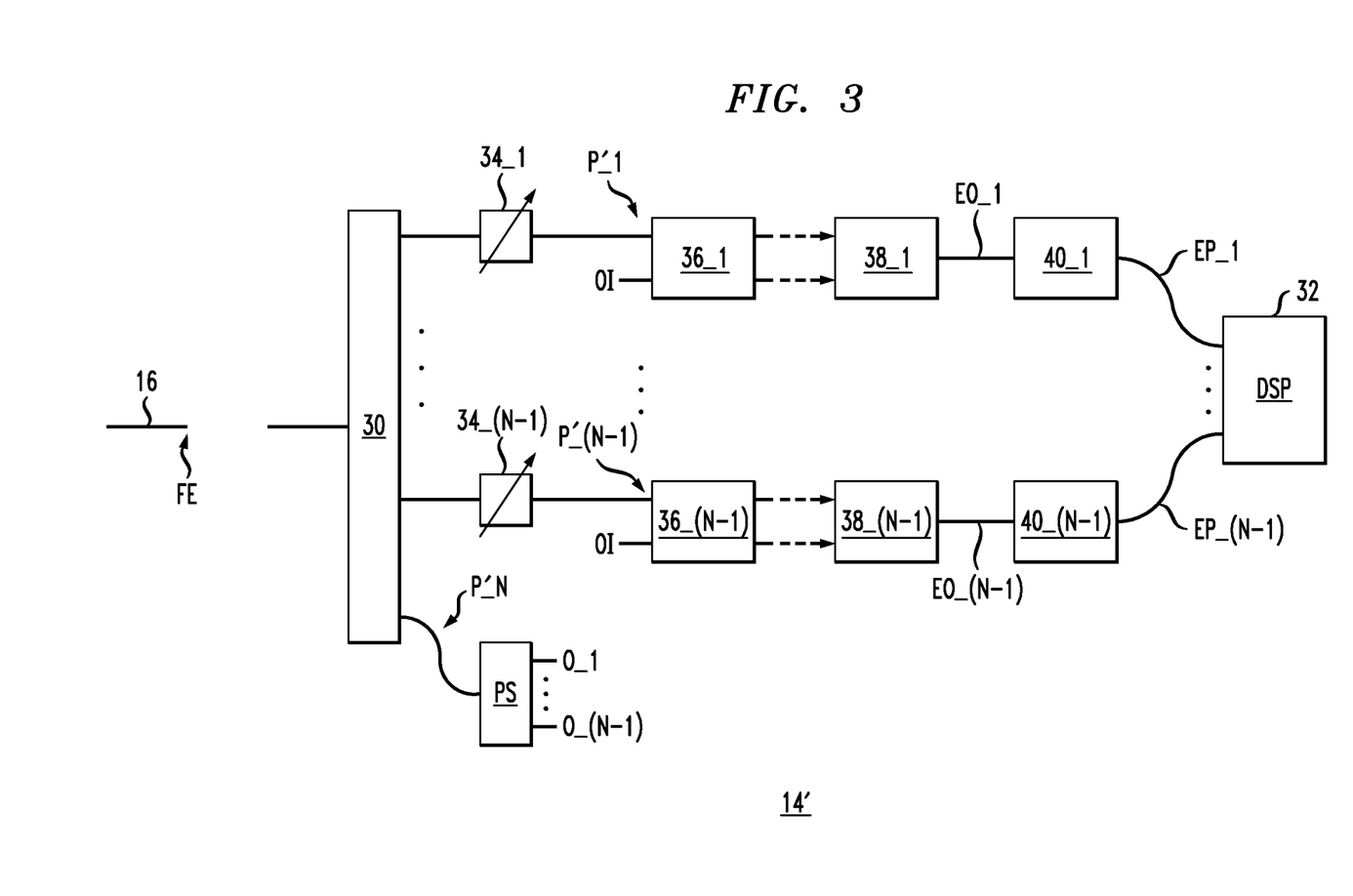
FIG. 3 is a block diagram illustrating a specific embodiment of the optical data receiver of FIG. 1, e.g., for use with the optical data transmitter of FIG. 2.

FIG. 3 illustrates a specific embodiment 14' of the optical data receiver 14 of FIG. 1. The optical data receiver 14' includes a 1×N optical mode demultiplexer 30, a parallel array of N optical paths P'_1, . . . , P'_(N−1), P'_N, and a digital signal processor (DSP) 32. Here, N is an integer that is greater than or equal to 1, e.g., as described with respect to FIG. 2.

The 1×N optical mode demultiplexer 30 receives light from the far end (FE) of the all-optical transmission fiber line 16 of FIG. 1. The 1×N optical mode demultiplexer 30 transmits light from the different propagating modes of the all-optical transmission fiber line 16 to different ones of the optical paths P'_1-P'_N of the parallel array.

The parallel array includes a first group of (N−1) optical paths P'_1, . . . , P'_(N−1) and a second group of the single optical path P'_N.

In the first group, the (N−1) optical paths P'_1, . . . , P'_(N−1) are configured to recover, from the signal light therein, (N−1) streams of electrical signals indicative of the (N−1) data streams transmitted, in parallel, by the optical data transmitter 12' of FIG. 2. Each optical path P'_1-P'_(N−1) may include an optical preprocessor 34_1, . . . , 34_(N−1), an optical mixer 36_1, . . . , 36_(N−1), an optical intensity detector 38_1, . . . , 38_(N−1), and an analog-to-digital converter 40_1, . . . , 40_(N−1).

In the second group, the single optical path P'_N outputs reference light for mixing with the signal light of the (N−1) optical paths P'_1, . . . , P'_(N−1) of the first group. For N=2, the reference light is guided, e.g., by an optical path (not shown), to an optical input OI of the optical mixer 36_1 of the single optical path P'_1 of the first group. For N>2, the optical path P'_N of the second group includes a 1×(N−1) optical power splitter PS that outputs the reference light at (N−1) optical outputs O_1, . . . , O_(N−1). Each optical output O_1, . . . , O_(N−1) connects by an optical path (not shown) to an optical input OI of a corresponding one of the (N−1) optical mixers 36_1-36_(N−1) of the first group. Thus, the optical path P'_N of the second group is optically connected to provide reference light for mixing with the signal light of the (N−1) optical path(s) P'_1-P'_(N−1) of the first group to enable optical matched detection of transmitted data.

In the (N−1) optical paths P'_1-P'_(N−1) of the first group, each optical mixer 36_1-36_(N−1) suitably mixes the signal light, which is received from the same optical path P'_1-P'_(N−1) at a first optical input, with reference light from the optical path P'_N of the second group, which is received at a second optical input OI. Each optical mixer 36_1-36_(N−1) may be, e.g., a conventional 90-degree optical hybrid or a pair thereof for outputting intensity modulated light indicative of in-phase modulations, quadrature-phase modulations, or both for the signal light.

Each optical intensity detector 38_1-38_(N−1) may be a conventional optical intensity detector for measuring such intensity modulated light at the optical outputs of a conventional 90-degree optical hybrid or a pair thereof. For example, each optical intensity detector may be a balanced pair of photo-sensitive diodes for measuring differential optical intensities at the paired optical outputs of a conventional 2×2 90-degree optical hybrid or two of such balanced pairs for measuring such differential optical intensities at the paired optical outputs of two 90-degree optical hybrids. Each optical intensity detector 38_1-38_(N−1) may produce analog electric signals at an electrical output lines EO_1, . . . , EO_(N−1) indicative of the in-phase and/or quadrature-phase modulations the corresponding signal light.

Each analog-to-digital converter 40_1-40_(N−1) outputs stream of digital signals on a corresponding electrical line EP_1-EP_(N−1) where the digital signals are indicative of temporal averages of the measurements of the corresponding optical intensity detectors 38_1-38_(N−1) averaged over a symbol period. Thus, the stream of digital signals may be a matched filter measurement of the digital data stream modulating the corresponding signal light.

Each optical preprocessor 34_1, . . . , 34_(N−1) processes the signal light of the corresponding path P'_1-P'_(N−1) of the first group so that said signal light produces substantial optical interference when mixed with reference light from the optical path P'_N of the second group in the corresponding optical mixer 36_1, . . . , 36_(N−1). In particular, the intensity of such optical interference is limited by the low temporal coherence of the signal light. For example, such processing typically includes appropriately delaying the signal light by passing the signal light of each path P'_1-P'_(N−1) of the first group through a suitably adjusted, conventional, optical delay line. For example, the accumulated relative temporal delay between the signal and reference light, when mixed, should typically be less than the temporal coherence length of the light. Also, such processing may include passing the signal light of each path P'_1-P'_(N−1) of the first group through a conventional dispersion compensator to remove differences in the accumulated chromatic and/or propagation mode-dependent dispersion between the signal and reference light. Also, such processing may include polarization rotating said signal light to remove differences in the accumulated relative polarization between the signal and reference light.

A suitable amount of such optical preprocessing, e.g., delay adjustment, dispersion compensation, and/or polarization rotation, may be set by performing appropriate training sessions, e.g., for the signal light transmitted to various relatively orthogonal optical propagation modes by the optical data transmitter 12 of FIG. 1. Techniques for performing such training such preprocessing and performing such training would be straightforward to determine for the person of ordinary skill in the relevant arts based on the disclosure of the present application.

In alternate embodiments (not shown), the (N−1) optical preprocessors 34_1-34_(N−1) of FIG. 3 may be moved to optically process reference light at the optical outputs O_1-O_(N−1) of the optical power splitter of the optical path P'_N of the second group rather than to optically process signal light of the (N−1) optical paths P'_1-P'_(N−1) of the first group.

The DSP 32 provides digital signal processing of the (N−1) digital data streams, e.g., for the recovery of DATA_1-DATA_(N−1) transmitted by the optical transmitter 12' of FIG. 2, i.e., based on (N−1) digital signal streams received on electrical lines EP_1, . . . , EP_(N−1). For example, such signal processing may include corrections of in-phase/quadrature-phase misalignments, error correction, and possibly multiple-input-multiple-output (MIMO) processing to remove transmission-generated crosstalk.

In some embodiments, the optical fiber communication system 10 FIG. 1 may be configured to transmit data in a polarization multiplexed manner using a single optical source of low temporal coherence.

Figure 5:
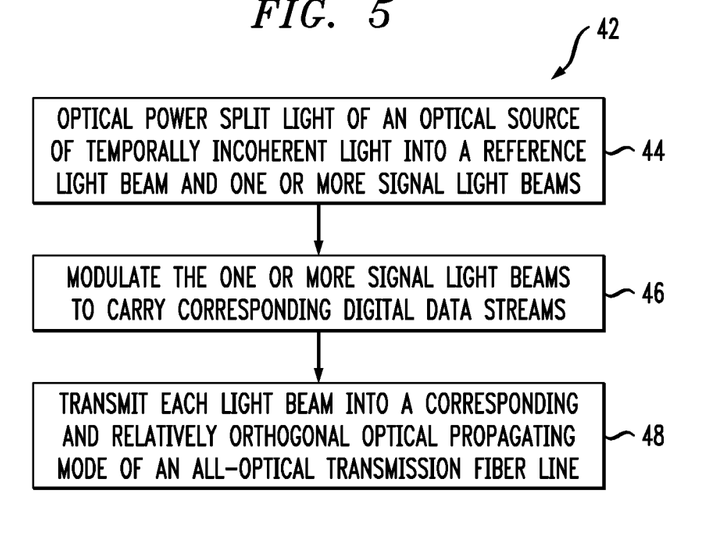
FIG. 5 is a flow chart illustrating a method of operating an optical data transmitter that transmits one or more low optical carriers of low temporal coherence, e.g., for operating the optical data transmitters of FIGS. 1-2.

FIG. 5 illustrates a method 42 for operating an optical data transmitter that transmits optical carriers of temporally incoherent light, i.e., low temporal coherence light, e.g., the optical data transmitters 12 and 12' of FIGS. 1 and 2.

The method 42 includes optical power splitting light from an optical source of temporally incoherent light into a reference light beam and one or more signal light beams (step 44). For example, such a splitting step may be performed with the optical power splitter 22 of FIG. 2.

The method 42 includes optically modulating each of the one or more signal light beams to carry a corresponding digital data stream, e.g., an independent digital data stream (step 46). The modulating step 46 may include phase and/or amplitude modulating said one or more signal light beams, e.g., using conventional amplitude or phase modulators, e.g., using the optical data modulators 26_1-26_(N−1) of FIG. 2, e.g., conventional nested or un-nested Mach-Zehnder interferometers. The optically modulating step 46 may modulate an optical carrier according to an ON/OFF format or a multi-level intensity modulation format with more than 2 intensity levels, e.g., at least, 4 or 8 intensity levels. The optically modulating step 46 may also modulate an optical carrier according a phase modulation format such as binary phase shift keying (BPSK), quadrature phase shift keying (QPSK), or one of the quadrature amplitude modulation (QAM) protocols such as 8-QAM, 16-QAM, etc. The optically modulating step 46 may also produce polarization multiplexing.

The method 42 includes transmitting each light beam primarily into a corresponding and relatively orthogonal optical propagating mode of an all-optical transmission fiber line at a near end thereof (step 48). The transmitting step 48 may be performed, e.g., using the optical mode multiplexer 24 of FIG. 2 and the all-optical transmission fiber line 16.

In some embodiments, the method 42 may also include relatively delaying the different modulated-signal light beams and possibly the reference light beam so that mutually coherent portions of said different light beams do not traverse the same segment of the all-optical fiber transmission line approximately simultaneously. For example, the relative temporal delays may be set to ensure that light of the different light beams enters the near end NE of FIG. 2 and occupies the same segment of the optical fiber transmission line with relative temporal delay(s) of one or more times the temporal coherence of the light source used to produce said light beams.

Figure 6:
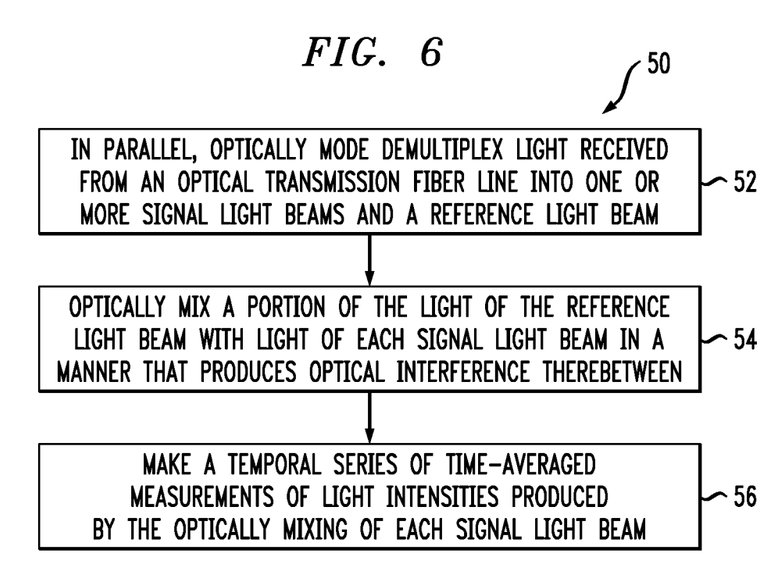
FIG. 6 is a flow chart illustrating a method of operating an optical data receiver that receives one or more data-modulated optical carriers of low temporal coherence, e.g., for operating the optical data receivers of FIGS. 1 and 3.

FIG. 6 illustrates a method 50 of operating an optical data receiver to demodulate data streams from one or more data-modulated optical carriers of temporally incoherent light, i.e., low temporal coherence light, e.g., using the optical data receivers 14, 14' of FIGS. 1 and 3.

The method 50 includes optically mode demultiplexing light received from an adjacent end of an optical transmission fiber line, in parallel, into one or more signal light beams of a first group and a reference light beam of a second group (step 52). The optical mode demultiplexing step 52 may be performed, e.g., using the optical mode demultiplexer 30 of FIG. 3.

The method 50 includes optically mixing a portion of the light of the reference light beam with light of each of the one or more signal light beams in a manner that produces optical interference therebetween (step 54). To produce such optical interference, light of each signal light beam and/or light of portions of the reference light beam to be mixed therewith is/are typically optically preprocessed prior to the optically mixing so that the optically mixing is performed between portions of the beams with substantial mutual coherence or with substantial mutual coherence variations. For that reason, the subsequent optically mixing can produce optical interference with optical intensity having significant temporal variation.

For example, such preprocessing may involve relatively delaying light of each signal light beam with respect to light of the reference light beam to be mixed therewith so that the total delay between the light to be mixed is less than the temporal coherence of said light. The preprocessing may also include reducing differences in relative dispersion and/or relative polarization of the light to be mixed. Such optically preprocessing may be performed, e.g., in the optical preprocessors 34_1-34_(N−1) of FIG. 3.

The method 50 includes making a temporal series of time-averaged measurements of light intensities produced by the optically mixing of each of the one or more signal light beams, separately, e.g., to produce, via matched filtering, a temporal stream of electrical signals indicative of the data stream modulated onto the corresponding signal light beam (step 56). Said making step 56 may be performed, e.g., with the parallel array of light intensity detectors 38_1-38_(N−1) and the analog-to-digital converters 40_1-40_(N−1) of FIG. 3. The time-averaged measurements are performed by averaging said measurements over the corresponding symbol periods.

The method 50 may also include performing digital signal processing to remove or to compensate optical degradations of the optical carriers, e.g., in the all-optical transmission fiber line 16 of FIG. 1, or by optical processing, e.g., in the optical data receiver 12, 12' of FIGS. 1 and 3. Such optical degradations may include optical crosstalk that may be further reduced by conventional multiple-input-multiple-output processing in the DSP 32 of FIG. 3. Such degradations may also include, relative phase errors and/or relative mixing amplitude errors, e.g., produced during optical mixing in the optical mixers 36_1-36_(N−1) of FIG. 3.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
   an optical data transmitter comprising
      an optical source of temporally incoherent light;
      an optical power splitter having an optical input and a plurality of optical outputs, the optical input being connected to receive the temporally incoherent light from the source;
      an optical mode multiplexer having a plurality of optical inputs and an optical output for connecting to a near end of an all-optical transmission fiber line; and
      a plurality of optical paths, each of the optical paths connecting a corresponding one of the optical outputs of the optical power splitter to a corresponding one of the optical inputs of the optical mode multiplexer; and
      one or more of the optical paths of the plurality of optical paths having an optical data modulator; and
      a remaining one of the optical paths of the plurality being configured to transmit reference light from the optical power splitter to the optical mode multiplexer.

2. The apparatus of claim 1, wherein the remaining one of the optical paths does not have an optical data modulator.

3. The apparatus of claim 2, wherein the optical data modulators of the one or more of the optical paths include Mach-Zehnder interferometers.

4. The apparatus of claim 1, wherein the optical mode multiplexer is configured to transmit light from each of the optical paths primarily to a corresponding and relatively orthogonal optical propagating mode of the all-optical transmission fiber line.

5. The apparatus of claim 1, wherein the optical mode multiplexer is configured to transmit light from some of the optical paths primarily to a corresponding and relatively orthogonal lateral spatial, optical propagating mode of the all-optical transmission fiber line.

6. The apparatus of claim 1, wherein the remaining one of the optical paths is configured to not temporally modulate light therein.

7. The apparatus of claim 1, wherein each pair of the optical paths is configured to transmit light from the optical source to the near end of the all-optical transmission fiber line with a relative delay longer than the temporal coherence of the optical source.

8. The apparatus of claim 1, further comprising the all-optical transmission fiber line; and an optical data receiver connected to a far end of the all-optical transmission fiber line; and wherein the relative delays are such that light traversing the optical paths of one of the pairs has a relative delay along the length of the all-optical transmission fiber line of greater than the temporal coherence thereof.

9. The apparatus of claim 1, wherein the optical data transmitter is configured to transmit the reference light and the light from at least one of the one or more of the optical paths primarily to different and relatively orthogonal polarization propagating modes of the all-optical transmission fiber line.

10. The apparatus of claim 1, wherein the optical source includes an optical amplifier not configured to produce lasing.

11. An apparatus, comprising:
    an optical data receiver comprising:
       an optical mode demultiplexer having an optical input and a plurality of optical outputs, each optical output being connected to a first end of a corresponding optical path of a parallel array;
       one or more of the optical paths being in a first group, each optical path of the first group having an optical mixer there along and being connected to deliver light of the optical path of the first group to a first optical input of the optical mixer;
       a remaining one of the optical paths of the array being connected to deliver light to a second optical input of each optical mixer; and
       for each optical mixer, a corresponding optical intensity detector configured to measure light interference at the optical output of the corresponding optical mixer.

12. The apparatus of claim 11, wherein the optical data receiver includes one or more optical processors to reduce a relative optical delay between light mixed in at least one of the optical mixers.

13. The apparatus of claim 12, each optical processor includes an adjustable optical delay line.

14. The apparatus of claim 12, wherein each optical processor includes, at least, an adjustable optical dispersion adjuster or an adjustable optical polarization rotator.

15. The apparatus of claim 11, wherein each optical mixer includes an optical hybrid.

16. The apparatus of claim 11, wherein the mode demultiplexer is configured to demultiplex light from relatively orthogonal optical propagating modes with different lateral intensity or phase profiles.

17. The apparatus of claim 11, wherein the mode demultiplexer is configured to demultiplex light from relatively orthogonal polarization propagating modes.

18. A method comprising
    optical power splitting light from an optical source of temporally incoherent light into a reference light beam and one or more signal light beams;
    modulating the one or more signal light beams to carry corresponding digital data streams; and
    transmitting each light beam primarily into a corresponding and relatively orthogonal optical propagating mode of an all-optical transmission fiber line at a near end thereof.

19. The method of claim 18, further comprising:
    relatively delaying a pair of the light beams so that mutually coherent portions of the light beams of the pair do not enter the near end of the all-optical fiber transmission line approximately simultaneously.

20. A method, comprising:
    optically mode demultiplexing light received from an adjacent end of an optical transmission fiber line, in parallel, into one or more signal light beams and a reference light beam;

optically mixing a portion of the light of the reference light beam with light of each of the one or more signal light beams in a manner to produce optical interference therebetween; and making a temporal series of time-averaged measurements of light intensities produced by the optically mixing of each of the one or more signal light beams, separately.

21. The method of claim 20, wherein the optically mixing further comprises optically processing the portion of light of the reference light beam or the light of each signal light beam to be mixed therewith to increase a mutual coherence of the light of said beams during said optically mixing.

* * * * *